DUANE T. PERKINS AND CHAS. F. HOVEY.
Improvement in Hose coupling.
No. 72892
PATENTED
DEC 31 1867
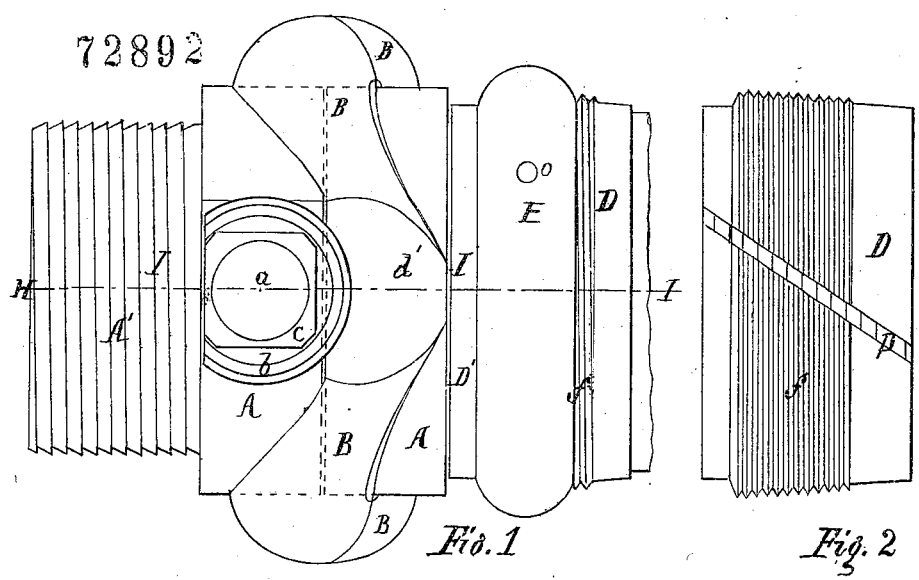
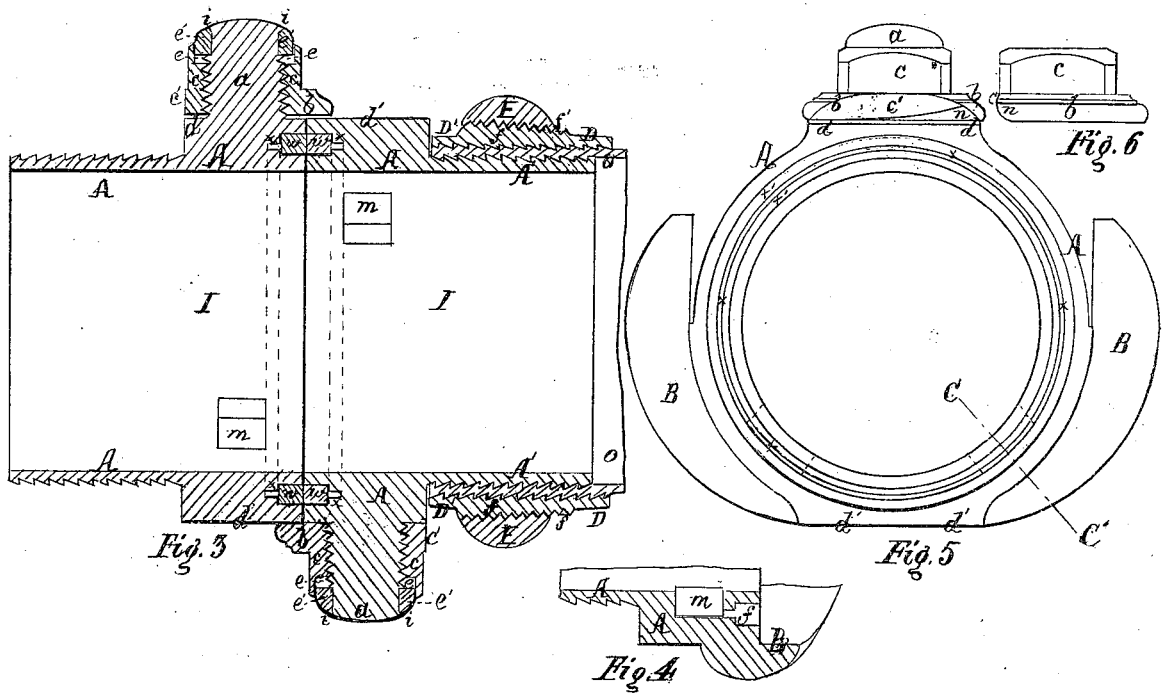
Witnesses.
T. A. Curtis
Geo. G. Merrick
Inventors.
Duane T. Perkins
Charles F. Hovey

UNITED STATES PATENT OFFICE.

DUANE T. PERKINS AND CHARLES F. HOVEY, OF SPRINGFIELD, MASS.

IMPROVEMENT IN HOSE-COUPLINGS.

Specification forming part of Letters Patent No. 72,892, dated December 31, 1867.

*To all whom it may concern:*

Be it known that we, DUANE T. PERKINS and CHARLES F. HOVEY, both of Springfield, in the county of Hampden and Commonwealth of Massachusetts, have invented a new and useful Improvement in Hose-Couplings; and we do hereby declare that the following is a full, clear, and exact description thereof, reference being had to the annexed drawings, making a part of this specification, in which—

Figure 1 is an elevation of a hose-coupling having our said improvements applied thereto. Fig. 2 is a side elevation of an expanding-sleeve used in attaching hose to the coupling. Fig. 3 is a longitudinal vertical section through the line H I, Fig. 1. Fig. 4 is a section through the line C C', Fig. 5, showing the packing-groove, water-channel, and port, the packing being removed. Fig. 5 is an end elevation of one of the two duplicate portions which form a complete coupling, the strip of packing being removed from the annular packing-groove; and Fig. 6 is a side elevation of the nut by means of which the two parts of the coupling are forced together and retained.

Our invention relates to certain improvements in hose-couplings, the first of which is applicable to the coupling for which Letters Patent No. 68,650 were issued to us on the 10th day of September, A. D. 1867, and has reference to the means of forcing into contact and retaining in place the two parts of such coupling when applied to one another. The second improvement is equally applicable to other hose-couplings than those described in our aforesaid Letters Patent, and relates to the packing which we employ to prevent any leakage between the two faces of the coupling.

The hose-coupling (shown in Figs. 1 and 3) consists of duplicate parts I and I', interlocked by means of the inclined lugs or ears B B, the body of each of the two parts consisting of the cylindrical portion A', which enters the hose, and the thicker part A, from which rise the ears B B, the interior of A and A' being smoothly finished for the free passage of water, the general form and construction of the body and inclined ears being substantially the same as set forth in our said Letters Patent, with the exception of the device for holding the two parts in contact and the shape of the packing-grooves and appurtenant parts.

The construction of our invention is as follows, having reference to the aforesaid three improvements, in the order in which they are first before stated: To bring the two parts I I' in close contact when they have been brought together by the interlocking ears, and to hold them securely in place, we use the nut $c$, turning on the stud $a$, which is cast upon the thicker part A, or may be made separate and screwed into it. A male screw-thread is cut upon it to engage with the female screw-thread cut in the nut $c$. As only a limited motion of the nut is required, and as it is also desirable to prevent the nut from being detached from the stud, and thus subject to misplacement and loss, an annular recess, $e$, is formed above the screw-thread in the nut, and the washer $e'$ is applied to the upper part of the stud $a$, the latter being turned down to form a shoulder, against which the washer rests. The end of the stud is then expanded by hammering so as to nearly fill the countersunk recess $i$ in the washer $e'$. In turning the nut, therefore, it can only rise until the shoulder upon the nut meets the lower face of the washer. The nut is made prismatic in horizontal section, so that it can be clasped and turned by a common wrench. The flange $b$, at the base of the nut, projects uniformly on three sides beyond the body, while on the fourth side, at $c'$, the flange is nearly cut away. The stud $a$ is set at such a point upon A that when the nut $c$ is in the position shown in Fig. 5 it does not project over the end face of the parts of the coupling; and after the parts I I' are interlocked the nut $c$ can be turned so as to bring the projecting flange $b$ over the side $d'$ of the adjacent part of the coupling, so that the parts cannot recede from one another. As the nut is turned farther inward it will cause the ears to slide upon one another, and thus draw the two parts of the coupling firmly and tightly together.

Although a nut upon one part would hold the coupling together, we construct a similar nut upon each part, so that the latter are interchangeable throughout. To facilitate the turning of the nut over the adjacent part, $d'$, a small portion of the lower edge, at $n$, is beveled, as shown in Fig. 5.

We believe that the application of a nut and stud, arranged as described, for forcing and holding together the two parts of a coupling which are interlocked by means of inclined ears or lugs, to be new; and, having described the same, we will set forth the second part of our invention, viz., the packing, which consists of an elastic strip set in an annular groove formed in the face of each part I I' of the coupling, behind which groove is an annular water-channel, opening into ports which communicate with the interior of the coupling. The packing projects slightly beyond the edges of the groove, and is also forced outward by the pressure of the water flowing into the water-channel when the hose is in use. The annular groove $x'$ $x'$ is made rectangular in transverse section, and the channel $x$ is cut in the inner end of the groove. Two openings, $m\,m$, which we denominate "ports," are formed in the inner surface of I, (and I',) at the side opposite the nut, which ports open into the water-channel $x$, as seen in Fig. 4. The packing $w$ consists of a strip of rubber cloth, so called, of sufficient thickness to fill the width of the groove $x'$, and of a width slightly more than the depth of the groove. If such a strip be crowded snugly into the groove, and the ends of it cut so as to meet closely, it is evident that when I and I' are interlocked the face of the packing in I will meet the face of that in I', and as the two parts are brought into close contact by turning the nuts $c\,c$, a water-tight joint will be made between the two parts of the coupling, and that when water is forced through the hose it will enter the openings $m\,m$ and pass into the water-channel $x$, and the greater the pressure of water within the hose the closer will be the joint between the parts of the coupling.

We are aware that the application of the water within a hose to act upon packing is or has been known and used; but we believe the construction of an annular groove in the face of either part of the coupling, containing an elastic packing, and having a water-channel behind it opening into the interior of the coupling, to be a novel and useful improvement in the construction of packing for hose-couplings.

It will be obvious that a coupling constructed as shown in Figs. 1 and 3 is applicable not only to hose composed of any material, but also to the coupling together of sections of any flexible tubing whatsoever, whether the same be of larger diameter than ordinary fire-hose or of different material, provided the same possess sufficient pliability to allow of the separation of the parts of the coupling.

Having described our invention, what we claim as new therein, and desire to secure by Letters Patent, is—

1. In a hose-coupling composed of two parts, I I', interlocking by means of the inclined ears or lugs B B, the nut $c$, turning upon the stud $a$, applied to either or both of said parts, substantially as and for the purpose set forth.

2. The annular groove $x'$, water-channel $x$, and ports $m\,m$, in combination with the elastic strip $w$, the whole arranged substantially as described, and constituting a packing, to be applied directly to the end of either or both parts of a hose-coupling, and operating both by its own elasticity and by the pressure of the water, as set forth.

In witness whereof we have hereunto set our hands this 21st day of October, A. D. 1867.

DUANE T. PERKINS.
CHARLES F. HOVEY.

Witnesses:
T. A. CURTIS,
GEO. G. MERRICK.